United States Patent [19]

Bisiach

[11] Patent Number: 4,669,390
[45] Date of Patent: Jun. 2, 1987

[54] ROBOT CARRIER STRUCTURE

[76] Inventor: Luciano Bisiach, Strada Comunale San Vito-Revigliasco, 350, 10133 Turin, Italy

[21] Appl. No.: 742,546

[22] Filed: Jun. 7, 1985

[30] Foreign Application Priority Data

Jun. 19, 1984 [IT] Italy .............................. 67630 A/84

[51] Int. Cl.[4] ............................................. B61B 12/00
[52] U.S. Cl. ................... 104/248; 104/246; 104/146; 105/108; 295/30; 295/31 R; 414/460; 901/1
[58] Field of Search ............... 414/744 R, 460; 901/1; 295/30, 31 R; 104/246, 248, 245, 133; 105/136, 108, 96, 96.1, 117; 308/DIG. 9

[56] References Cited

U.S. PATENT DOCUMENTS

| 860,847 | 7/1907 | Beecher | 104/246 |
|---|---|---|---|
| 1,536,122 | 5/1925 | Miller | 104/246 |
| 1,791,663 | 2/1931 | Edson | 104/246 |
| 2,033,863 | 3/1936 | Piron | 295/31 R |
| 2,622,993 | 12/1952 | McCullough et al. | 308/DIG. 9 X |
| 2,941,675 | 6/1960 | Noble et al. | 414/460 X |
| 3,180,280 | 4/1965 | Kuch et al. | 104/245 |
| 3,266,641 | 8/1966 | Thumin | 414/19 |
| 3,408,954 | 11/1968 | Kademann et al. | 105/117 X |
| 3,547,284 | 12/1970 | Dunbar | 104/248 X |
| 4,192,986 | 3/1980 | Udagawa et al. | 901/1 X |

FOREIGN PATENT DOCUMENTS 98822 8/1964 Denmark ............................ 901/1 X Primary Examiner—Robert J. Spar
Assistant Examiner—Donald W. Underwood
Attorney, Agent, or Firm—Dilworth, Paxson, Kalish & Kauffman

[57] ABSTRACT

A robot carrier structure constituted by a carriage movable on rails and supported on four wheels two of which are mounted on a driven shaft and two are idle wheels. Each drive wheel has a structure adapted to ensure a high adherence to the rail, particularly due to the provision of a pair of rings of elastomeric material in engagement with the rolling surface of the rail. Engagement means movable laterally on the rail are provided to increase the adherence of the drive wheels.

2 Claims, 7 Drawing Figures

ROBOT CARRIER STRUCTURE

BACKGROUND OF THE INVENTION

This invention relates to a robot carrier structure with a carriage movable on rails.

In industrial processing using robots, particularly in automatic welding, the robot is generally designed as a substantially stationary operating unit to which the workpiece is fed from a conveying line along which further processing machines or units are arranged.

Although in high and very high output lines the use of several fixed robots, each of which carries out a part of the overall work on workpieces translating past the robot, is generally efficient and advantageous, in low and very low output lines or lines with diversified production, this system has proved to be completely disadvantageous. In fact, it requires the use of an excessive number of robots as many as there are operations to be carried out - and moreover such robots are insufficiently utilized as each of them is operative only for a small fraction of the overall working time.

Therefore, it has been found more advantageous to use only one or a few robots for several uses, i.e. robots capable of successively carrying out several operations, however these robots must be shifted in the operating area close to the workpiece or to the part on which the operation is to be carried out.

It is therefore an object of the present invention to provide a structure for supporting and moving a multi-purpose industrial robot, which structure is capable of moving the robot within a predetermined area to convey it to the workpiece to be treated, this structure being further such as to leave the used area, after passage of the structure, free and practicable for potential further use.

In other words, the invention permits to reverse the general concept of a robot as a fixed installation and to provide a transport structure adapted to receive a multi-purpose robot so that the robot can carry out several different operations along an entire processing area with low or diversified output.

SUMMARY OF THE INVENTION

These and other objects and advantages of the invention, which will become apparent from the following description, are achieved by a robot carrier structure provided with linear movement and constituted by a carriage on which an industrial robot with several axes of movement is mounted, this structure being equipped with members for actuation and control of programmed translation of the structure and characterized in that the carriage is supported by four wheels running on a pair of rails accommodated in underground runways with a rolling surface located substantially level with the ground, two of the wheels being mounted on a driven shaft and the other two being mounted for idling movement and independently on the structure, there being further provided engagement means firmly secured to the structure and adapted to run laterally on the flanks of the rails.

According to a further aspect of the invention, the structure of the drive wheel supporting the carriage comprises a pair of rims defining a groove with the wheel body for engagement with the rail, the inner portions of the rims designed to engage the rail being coated with a self-lubricating metallic material, and between the rims and the wheel body there is coaxially accommodated a pair of rings of elastomeric material projecting a little from the wheel body so as to increase the adhesion of the wheel to the rail and avoid slipping.

DESCRIPTION OF PREFERRED EMBODIMENT

Figure 1:
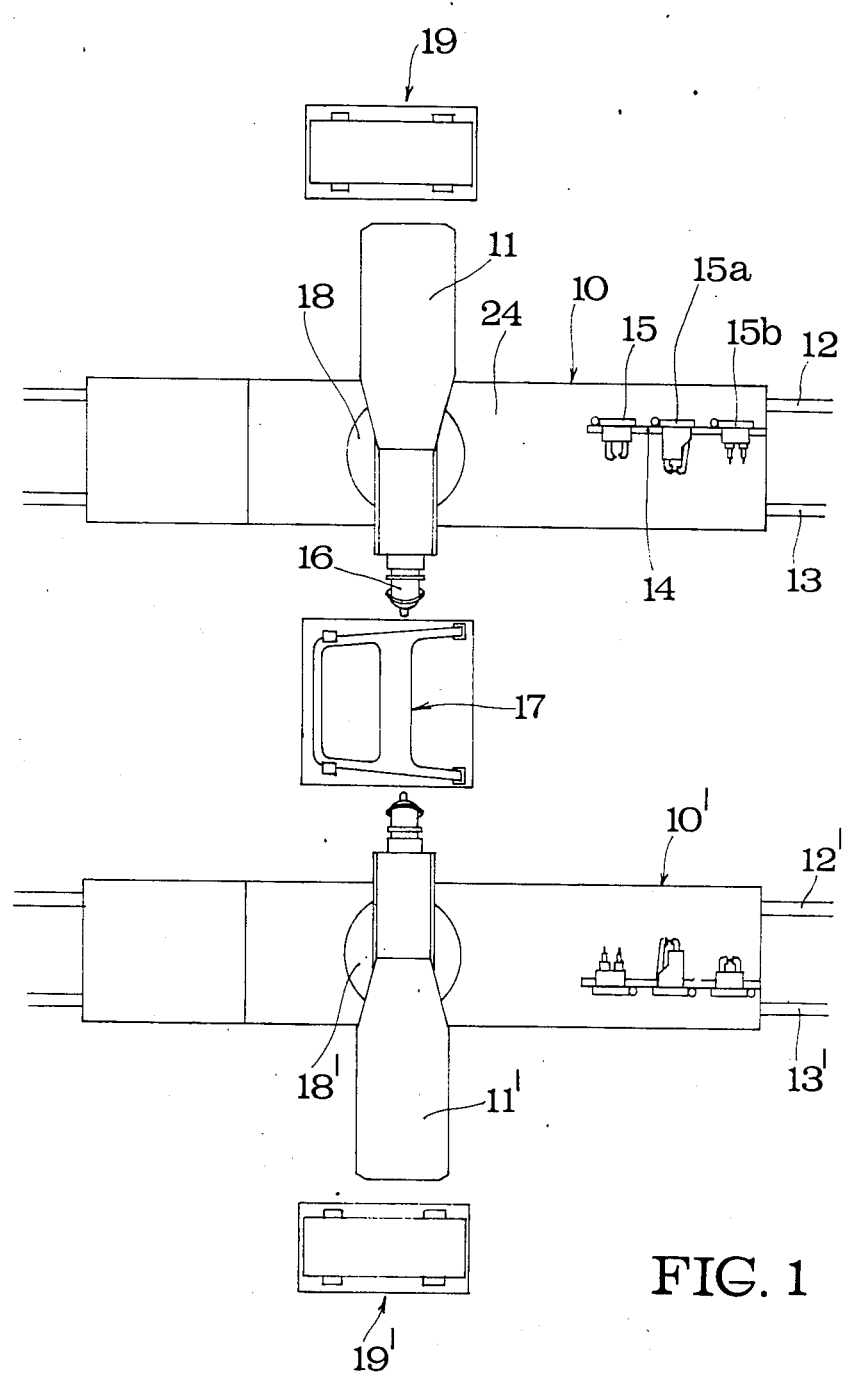
FIG.1 is a schematic top plan view of a pair of robot supporting structures according to the invention.

Referring to FIG. 1, indicated by 10 is a carriage on which an industrial robot 11 is mounted, all shown schematically in top plan view. The carriage is movable on a pair of rails 12, 13 running through the working area.

According to a preferred, but not exclusive, embodiment of the invention, the robot 11 is a welding robot with a mechanism for automatically changing the welding guns as described in Italian Patent Application No. 67130-A/84 of the same Applicant.

For this purpose carriage 10 is equipped with a guns magazine 14 in which various guns 15, 15a, 15b etc. are arranged which the robot is capable of picking up and automatically fixing on a head 16 after having deposited on the magazine the previously mounted guns. The carriage 10 will also be equipped with the members for programmed actuation of the robot and for translation of the carriage, these members being not shown as they are known to one skilled in the art.

If the robot is designed to carry out automatic welding operations in a low output line such as the welding of cabs 17 or industrial vehicle bodies, the carriage 10 may advantageously be coupled to an identical carriage 10' carrying another robot 11' equipped with all the aforementioned elements to carry out the same operations.

By coupling the two structures on parallel pairs of rails 12, 13 and 12', 13', the robots can be located as desired on a large working area both inwardly of the tracks 12, 13 and 12', 13' and outwardly thereof as it is intended to mount the robots 11, 11' on rotatable bases 18, 18' to reach also the equipments 19, 19'.

The processing method with movable robots on the structures described above constitutes an inversion of the conventional practice of use of robots in the industrial field as pointed out in the introductory part to the specification. Particularly if one has a multi-purpose robot as the one mentioned with automatic changing of the welding tool, the number of machines required for the execution of many different types of welding can be enormously reduced and the robot can be moved cyclically along the production line from which the workpieces to be welded are successively removed and replaced thereon with considerable advantage both with regard to the installation and running of the line.

However, the achievement of this result depends on the provision of a robot supporting and conveying structure which is at the same time rapid, accurate and reliable. For this purpose the structure according to the invention has been provided which is shown in detail in FIGS. 2 to 6.

Figure 2:
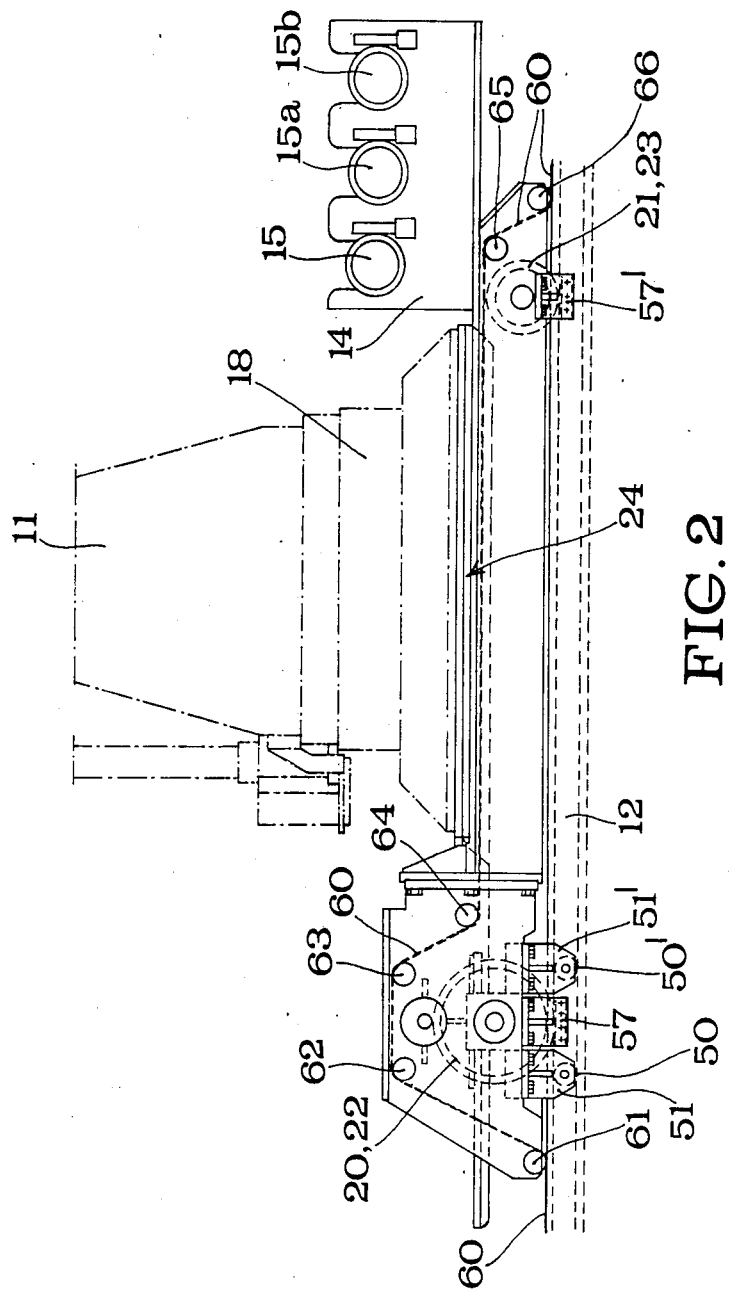
FIG. 2 is a side elevational view of a robot supporting structure according to the invention.

Referring to FIG. 2, the structure according to the invention is shown in side elevation and the robot 11 is partially and schematically shown in dash-and-dot lines. On the other hand, FIG. 3 shows the structure of FIG. 2 in front elevation, with the front portion of the structure including the drive wheels in a schematic section.

Referring to the Figures, the robot carrier structure 10 according to the invention consists of a carriage with four wheels 20, 22 and 21, 23 provided upwardly with a platform 24 on which the rotatable base 18 of the robot is centrally mounted together with the guns magazine 14 with the series of welding guns 15, 15a, 15b. Wheels 20, 22, and 21, 23 are of the railway type and run on the pair of rails 12, 13, as shown in FIGS. 1 and 3. The particular structure of these wheels and particularly of the drive wheels 20, 22 constitutes an important aspect of the invention, as will be described hereinafter.

Figure 3:
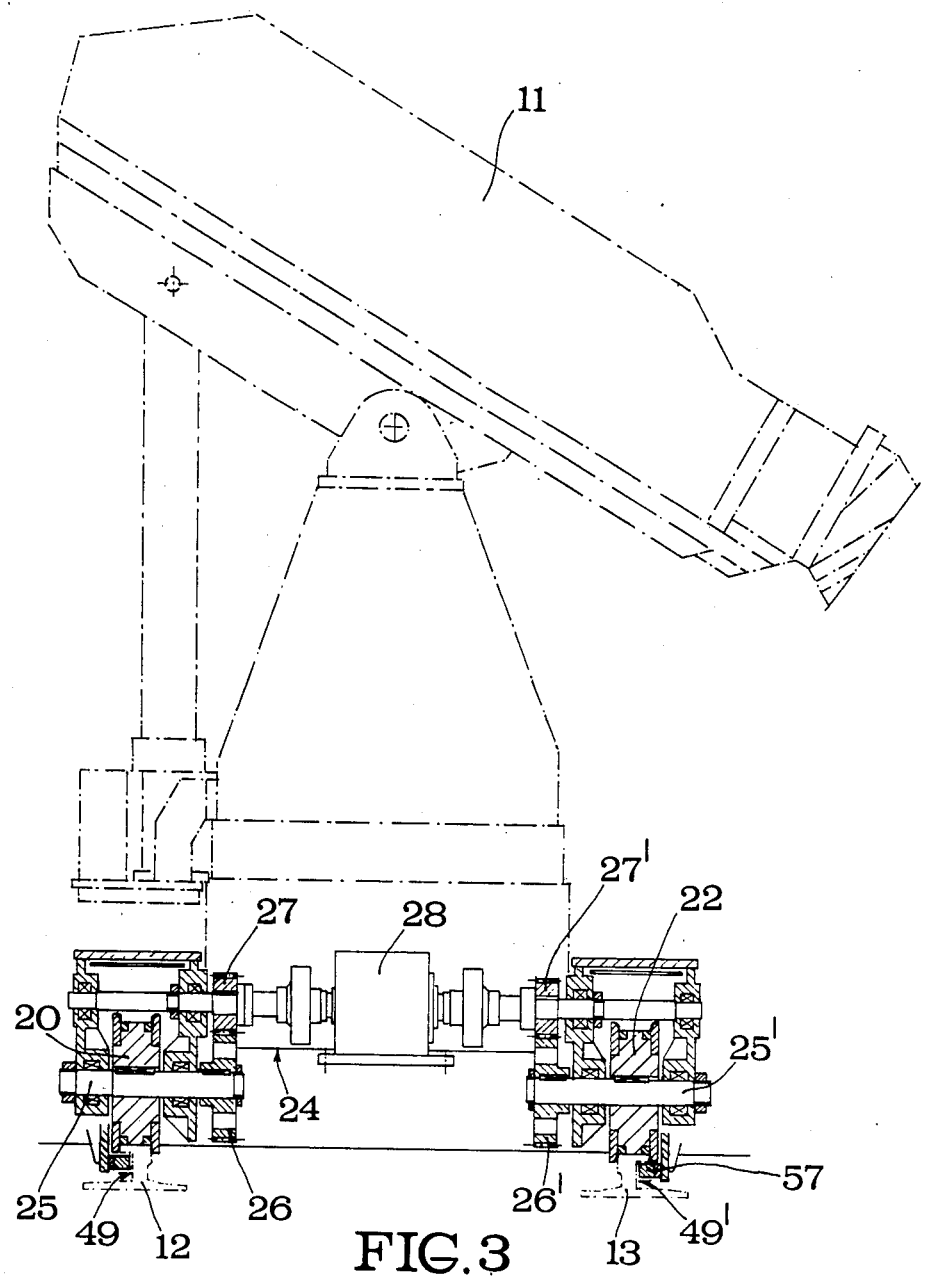
FIG. 3 is a front elevational view, partly in section, of the structure of FIG. 2.

Wheels 20 and 22, as is also shown in FIG. 3, are mounted on shafts 25, 25' on which also toothed wheels 26 and 26' are mounted inwardly of the wheels. Toothed wheels 26, 26' mesh with pinions 27 and 27' driven by an electric motor, not shown, coupled to a geared motor unit 28 so as to ensure perfectly synchronized rotation of the wheels.

This arrangement of the motor means above the axis of the wheels 20, 22 is advantageous as it leaves the space between the toothed wheels 26, 26' free for the passage of feed cables which the carriage drags along during its translating movement. On the other hand, wheels 21, 23 are mounted for idling movement and independently of one another as they have no driving function. They have a smaller diameter than that of wheels 20, 22 so that it is possible to lower the platform 24 of the carriage to support the robot 11 at a convenient level from the ground for the execution of the required operations.

The structure of the drive wheels 20, 22 constitutes a further important aspect of the invention.

Figure 4:
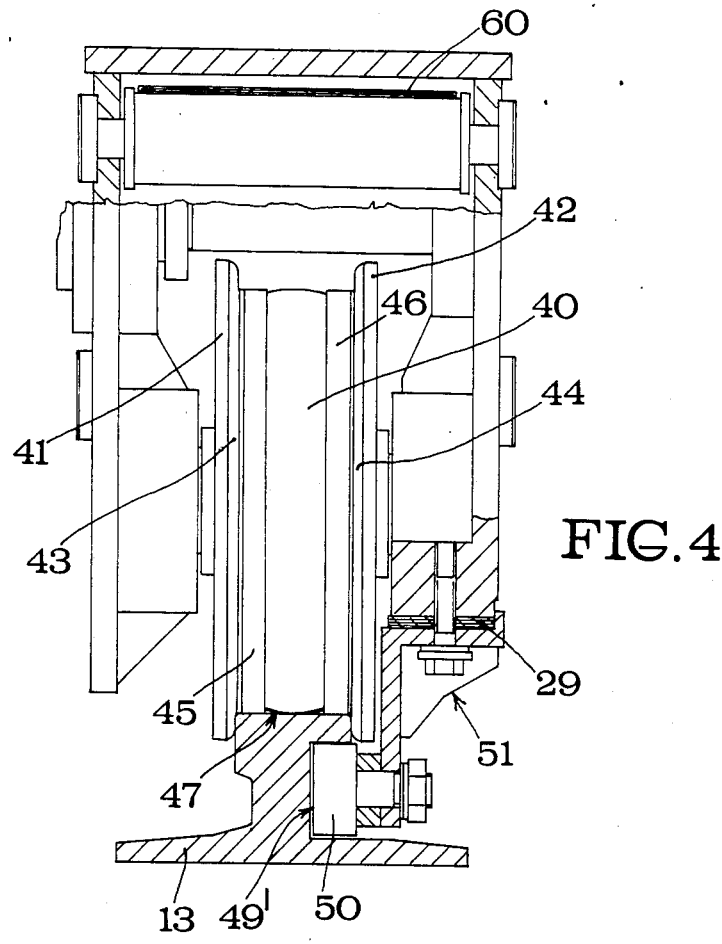
FIGS. 4 and 7 are views of details, partly in section, of the structure according to the invention.
Figure 7:
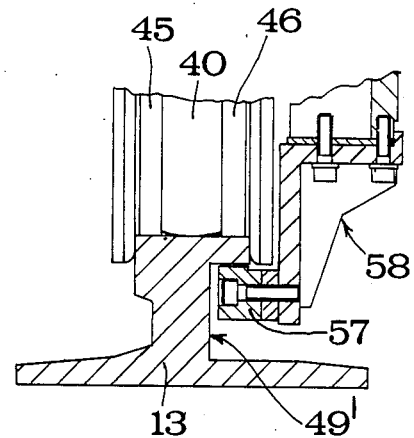
Figure 5:
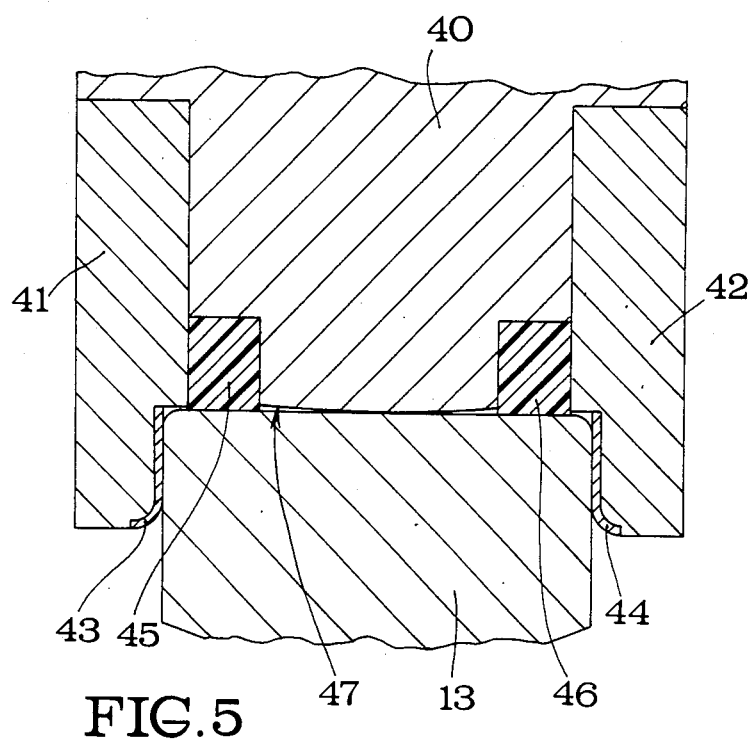
FIG. 5 is an enlarged sectional view of a detail of the structure according to the invention.

Referring to FIGS. 4, 5 and 7, each wheel comprises a wheel body 40 of treated steel of good hardness and a pair of rims or flanges 41, 42 projecting peripherally from the profile of the wheel body 40 to form a groove adapted for laterally sealing rolling on the rail.

The inner portions of rims 41 and 42 designed to engage the flanks of the rail are coated with rings 43, 44 of a self-lubricating metallic material, for example molybdenum.

A pair of rings 45, 46 of elastomeric material is arranged radially inwardly between the rims 41, 42 and appropriate seats in the wheel body 40 so as to be in contact with a rolling surface 47 of the wheel and ensure perfect rolling of the wheel without slipping. Rings 45, 46 project a little from the profile of the wheel body which is slightly convex so as to ensure during operation a perfect adhesion between the rail and the wheel without any risk of axial oscillations. A preferred elastomeric material is the one available in commerce under the Trademark VULKOLLAN which designates a urethane elastomer of BAYER AG.

The wheel structure described above has proved to be very important and advantageous, particularly for eliminating potential slipping which could jeopardize the high accuracy of positioning required for the intended use. Consequently, a reading of the translation of the carriage can be obtained either directly from the number of revolutions of the wheel or from a known encoder system by engagement with a toothing 48 extending longitudinally along the rail 13.

To further increase the adhesion of the wheels 20, 22, a continuous groove 49, 49' is provided on the outer flanks of each rail 12, 13 to receive and retain one or more idler rollers 50, 50' secured to brackets 51, 51' depending from the carriage structure laterally of the wheels 20, 22 (FIGS. 2 and 4).

Brackets 51, 51' are not completely rigid, but comprise a resilient means 29 constituted, for example, by one or more layers of elastomeric material and adapted to be compressed during the mounting operation to ensure a constant pressure to be exerted by the rollers 50, 50' on the wheels so that the latter will be in constant forced engagement with the rail.

FIG. 7 shows another member 57 engaging the groove 49' of rail 13. Member 57 simply consists of a parallelepiped block secured to the structure of the carriage by means of a completely rigid bracket 58. The function of this member and the corresponding member 57' associated with the wheels 21, 23 is that of ensuring a pressure to be exerted when the working movements of the robot produce loads which would tend to unbalance or upset the carriage if the latter was not mechanically connected to the rail.

Figure 6:
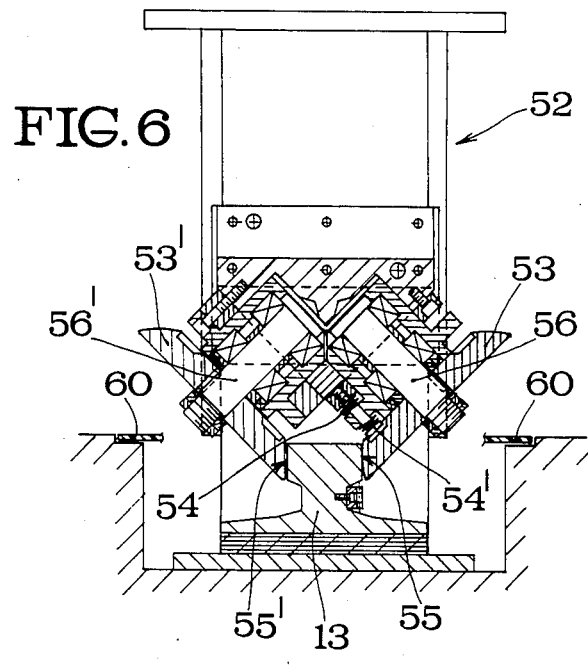
FIG. 6 is a sectional view of another detail of the structure according to the invention.

FIG. 6 illustrates a member which constitutes a complement to the conveying structure according to the invention. It can be adopted to improve the performance of the assembly although it is not always strictly necessary.

Generally designated by 52 in FIG. 2 is a guide assembly firmly mounted in front of and behind the carriage either on one or both sides, as required. Guide assembly 52 substantially consists of a pair of wheels 53, 53' mounted on idler shafts 56, 56' arranged at 45° relative to the vertical plane so that the wheels converge on the flanks of rail 13. Whereas the wheel 53' is mounted without any possibility of axial movement, the wheel 53 can perform a certain axial excursion against the reaction of two packs of Belleville washers 54, 54', which permits to always maintain a forced engagement between the oblique surfaces 55, 55' of the wheel and the flanks of the rail. This guide assembly stabilizes the carriage against potential oscillations acting in a sideways direction, thus increasing the accuracy of the overall attitude during the translating motion.

As is evident particularly from FIGS. 3 and 6, the rails 12 and 13 are accommodated in underground runways of a depth such that the rolling surface of the rail will be located substantially level with the ground.

According to a further feature of the invention, a sturdy belt 60 extends throughout the robot carrier structure and has a width equal to that of the runway which is upwardly closed by the belt, as shown also in FIG. 7, over its entire extension except for the length covered by the robot carrier structure.

Over this length the belt 60 is deflected between rollers 61, 62, 63, 64, 65 and 66 so as to be lifted above the wheels. This feature permits to obtain a permanent covering of the runway and, after passage of the carriage, permits the working area to be left free and practicable by operators, as stated in the introductory part to the specification.

Although in the foregoing description of the preferred embodiment of the invention reference has been made to a robot carrier structure on which a welding robot is mounted, it is evident that this structure can be advantageously used for conveying other types of industrial robots such as manipulating robots, in view of the fact that this robot carrier structure has a high accuracy of movement. Further, this structure permits of numerous modifications and variations within the scope of the same inventive idea.

I claim:

1. A robot carrier structure for linear movement along a predetermined working area, supporting an industrial robot with several axes of movement, said structure consisting essentially of a carriage comprising:

a. a platform for mounting a rotatable base of said robot;
   b. four wheels of the railway type, adapted to run on a pair of rails accommodated in underground runways with rolling surfaces located substantially level with the ground with the outer side of each of said rails being provided a continuous straight groove;
   c. drive means coupled with two wheels transversely opposed through toothed wheels and pinions, said drive means being equidistant from said two transversely opposed wheels, and the other two of said four wheels being idling wheels;
   d. pressure member means rigidly connected to said carriage in correspondence with each of said wheels and received in said grooves of said rails, said pressure member, being operative when the carriage is stationary and when said robot produces unbalanced loads, for contacting said rails whereby said structure is stabilized;

wherein each of said wheels coupled with said drive means comprises a pair of rims defining a groove with a central wheel body of transverse convex profile, the inner portions of said rims intended to engage the flanks of said rail being coated with a self-lubricating metallic material and a pair of rings of elastomeric material being located between said rims and said wheel body to project from the profile of said wheel body, whereby the adhesion of said wheel to said rail is increased.

2. A robot carrier structure for linear movement along a predetermined working area, supporting an industrial robot with several axes of movement, said structure consisting essentially of a carriage comprising:

a. a platform for mounting a rotatable base of said robot;
   b. four wheels of the railway type, adapted to run on a pair of rails accommodated in underground runways with rolling surfaces located substantially level with the ground with the outer side of each of said rails being provided a continuous straight groove;
   c. drive means coupled with two wheels transversely opposed through toothed wheels and pinions, said drive means being equidistant from said two transversely opposed wheels, and the other two of said four wheels being idling wheels;
   d. pressure member means rigidly connected to said carriage in correspondence with each of said wheels and received in said grooves of said rails, said pressure member, being operative when the carriage is stationary and when said robot produces unbalanced loads, for contacting said rails whereby said structure is stabilized;

wherein said structure includes a group of deflection rollers having a horizontal axis and located partly level with the ground and partly above said wheels of said carriage, a flexible belt being guided around said rollers to form a movable closure surface for said underground runway.

* * * * *